United States Patent [19]

Tanaka et al.

[11] Patent Number: 5,343,783
[45] Date of Patent: Sep. 6, 1994

[54] SPEED CHANGE CONTROLLER FOR A VEHICLE AUTOMATIC TRANSMISSION

[75] Inventors: Yoshikazu Tanaka; Masuo Kashiwabara, both of Atsugi, Japan

[73] Assignee: Unisia Jecs Corporation, Atsugi, Japan

[21] Appl. No.: 81,243

[22] Filed: Jun. 29, 1993

[30] Foreign Application Priority Data

Nov. 7, 1991 [JP] Japan .................. 3-291547

[51] Int. Cl.$^5$ .......................................... F16H 59/24
[52] U.S. Cl. .................................................. 477/131
[58] Field of Search ................................. 74/844, 866

[56] References Cited

U.S. PATENT DOCUMENTS

| | | | |
|---|---|---|---|
| 4,841,815 | 6/1989 | Takahashi | 74/866 |
| 5,021,958 | 6/1991 | Tokoro | 364/426.04 |
| 5,067,374 | 11/1991 | Sakai et al. | 74/866 |
| 5,079,705 | 1/1992 | Sakai et al. | 364/424.1 |
| 5,101,350 | 3/1992 | Tokoro | 364/424.1 |
| 5,235,875 | 8/1993 | Yoshida et al. | 74/866 |
| 5,245,541 | 9/1993 | Tomomatsu et al. | 364/424.1 |

FOREIGN PATENT DOCUMENTS

| | | |
|---|---|---|
| 62-194231 | 12/1987 | Japan . |
| 63-2745 | 1/1988 | Japan . |
| 63-18053 | 4/1988 | Japan . |
| 63-270963 | 11/1988 | Japan . |
| 64-30959 | 2/1989 | Japan . |
| 1-247856 | 10/1989 | Japan . |

*Primary Examiner*—Dirk Wright
*Attorney, Agent, or Firm*—Foley & Lardner

[57] ABSTRACT

A speed change controller for vehicle automatic transmission is constructed such that a speed change range is selected on the basis of vehicle speed and throttle valve opening, and a speed change position for either a low speed change step or a high speed change step is selected from the speed change range by recognizing/judging the vehicle driving conditions. As a result speed change timing can be appropriately controlled to suit to environmental changes, and speed change control catering equally to the individual needs of a large variety of drivers is possible.

5 Claims, 5 Drawing Sheets

Fig 8

| FDWN \ FUP | 0 ~ 0.25 | 0.25 ~ 0.5 | 0.5 ~ 0.75 | 0.75 ~ 1.0 |
|---|---|---|---|---|
| 0 ~ 0.25 | H | H | UP | UP |
| 0.25 ~ 0.5 | H | H | UP | UP |
| 0.5 ~ 0.75 | DWN | DWN | H | H |
| 0.75 ~ 1.0 | DWN | DWN | H | H |

Fig.9

| | SOLENOID 6A | SOLENOID 6B |
|---|---|---|
| FIRST SPEED | ON | ON |
| SECOND SPEED | OFF | ON |
| THIRD SPEED | OFF | OFF |
| FOURTH SPEED | ON | OFF |

SPEED CHANGE CONTROLLER FOR A VEHICLE AUTOMATIC TRANSMISSION

TECHNICAL FIELD

The present invention relates to a speed change controller for a vehicle automatic transmission. More specifically, the present invention relates to technology for recognizing the environment in which a vehicle is traveling, and the intention of the vehicle driver, and controlling a speed change position of the vehicle automatic transmission accordingly.

BACKGROUND ART

With conventional electronically controlled automatic transmissions for vehicles, the speed change timing for speed change control is generally preset in the following manner.

The automatic transmission is provided with a map of speed change patterns in which speed change positions (gear positions) are set so as to give an optimum torque to suit the vehicle speed and throttle valve opening. Speed change control is carried out on the basis of this map when the select lever is in the D-range (drive range) position (see for example unexamined Japanese utility model publication No. 62-194231).

With the conventional arrangement however, wherein the speed change position is read from a map of set speed change positions versus vehicle speed and throttle valve opening, and set to a speed change position based on the current vehicle speed and throttle valve opening, the control characteristic target for the speed change timing is preset. Hence in the case of a vehicle traveling topography environment, with changes in altitude for example, then due to the reduction in air density at high altitudes, a discrepancy occurs in the relationship between throttle valve opening and engine torque at higher or lower altitudes. With the conventional arrangement, the engine torque is lower at the higher altitude compared to that at a lower altitude for the same throttle valve opening.

Further, with increased running resistance when driving up hill, the preset speed change map no longer conforms to the optimum speed change pattern. The driver thus experiences a different drive feel, and throttle control and selector control become troublesome.

It is also difficult with the conventional arrangement to obtain a speed change control with caters equally to the individual needs of a large variety of drivers.

In view of the foregoing, it is an object of the present invention to provide a speed change controller whereby speed change timing can be controlled appropriately to suit environmental changes, and which can cater equally to the individual needs of a large variety of drivers, by means of a novel structure realized by the present inventors wherein a speed change curve is determined by limting a speed change region.

DISCLOSURE OF INVENTION

The speed change controller according to the present invention as shown in FIG. 1, comprises an automatic transmission A provided on the output side of an internal combustion engine of a vehicle, a vehicle speed sensor B for sensing vehicle speed, a throttle valve opening sensor C for sensing the opening of a throttle valve in an air intake system of the engine, a driving conditions cognition device D for cognition/judgment of vehicle driving conditions, a speed change range storage device E for prestoring, on the basis of vehicle driving conditions, speed change ranges contained in a plurality of speed change steps and classified into a number of partitions ranging from a first speed change range for traveling speeds of n or n+1, to a k+1 speed change range for traveling speeds of n+k or n+k+1, a speed change range selector F for selecting from the speed change range storage device E a single speed change range out of the speed change ranges from the first speed change range to the k+1 speed change range, on the basis of vehicle speed and throttle valve opening sensed by the vehicle speed sensor B and throttle valve opening sensor C respectively, a speed change step selection device G for selecting from the selected speed change range, a speed change position for either a low speed change step or a high speed change step, on the basis of vehicle driving conditions recognized by the driving conditions cognition device D, and a shift change device H for changing the shift step of the automatic transmission A according to the selected speed change position.

With the above construction, a speed change range is selected on the basis of the current vehicle speed and throttle valve opening, from the storage device wherein speed change ranges corresponding to vehicle speed and throttle valve opening are specified. Also, the vehicle driving conditions are recognized/judged and either a low speed change step or a high speed change step in the speed change range is selected.

In this way a more accurate speed change judgment compared to that of conventional apparatus is possible. Also since speed change timing is not judged mechanically by throttle valve opening and vehicle speed on the basis of predetermined speed change curves as with conventional apparatus, speed change control to suit to driving conditions and environmental changes becomes possible.

Furthermore, speed change control in accordance with the intentions of the drivers may be realized, making it easy to cater equally to the individual requirements of a large variety of drivers.

The above mentioned automatic transmission may include a torque converter, a gear type speed changer connected to the engine output shaft by way of the torque converter, and an actuator for engagement and disengagement of various gears in the gear type speed changer, the arrangement and construction being such that speed change control may be effected through the gear type speed changer by control of the actuator.

Furthermore, the speed change storage device may comprise a predetermined map of speed change ranges contained in a plurality of speed change steps and classified into a number of partitions ranging from a first speed change range for traveling speeds of n or n+1, to a k+1 speed change range for traveling speeds of n+k or n+k+1, the map being stored on the basis of vehicle speed and throttle valve opening in a ROM incorporated into a control unit.

This map predetermines, first (first speed, second speed), second (second speed, third speed) and third (third speed, fourth speed) speed change ranges corresponding to vehicle speed and throttle valve opening.

The driving conditions cognition device may comprise first, second and third storage devices wherein the relationships between each of the vehicle speed, throttle valve opening and average throttle valve opening parameters and membership values, are pre-stored for each of the vehicle speed, throttle valve opening and average throttle valve opening, these relationships determining the respective evaluation criteria for shift up (UP) and shift down (DWN) operations, a first look-up device for reading from the first storage device, a shift up (UPV) membership value, or a shift down (DWNV) membership value corresponding to a vehicle speed, a second look-up device for reading from the second storage device, a shift up (UPT) membership value, or a shift down (DWNT) membership value corresponding to a throttle valve opening, a third look-up device for reading from the third storage device, a shift up (UPAT) membership value, or a shift down (DWNAT) membership value corresponding to an average throttle valve opening, a first setting device for selecting and setting the smallest of the read UPT, UPV and UPAT membership values, a second setting device for selecting and setting the smallest of the read DWNT, DWNV and DWNAT membership values, a fourth storage device in which judgement results for shift up (UP), shift down (DWN) and hold (H) are preset by the smallest of the UPT, UPV and UPAT membership values, and the smallest of the DWNT, DWNV and DWNAT membership values, and a fourth look-up device for reading from the fourth storage device, judgment results corresponding to the smallest of the current UPT, UPV, UPAT membership values, and the smallest of the current DWNT, DWNV, DWNAT membership values. The before mentioned speed change step selection device may comprise an output device for outputting to the shift change device, on the basis of the judgement result read by the fourth look-up device, one of a shift up (UP), a shift down (DWN) or a hold (H) command.

In this way, by processing the information through fuzzy deduction wherein driving conditions of the vehicle (including ambient conditions) are captured as a plurality of parameters, a more accurate speed change judgment than with conventional equipment becomes possible. Also since speed change timing is not judged mechanically by throttle valve opening and vehicle speed on the basis of predetermined speed change curves as with conventional apparatus, speed change control to suit driving conditions and environmental changes becomes possible.

BRIEF DESCRIPTION OF THE DRAWINGS

FIG. 8 represents a map used for guiding the control results of the embodiment of FIG. 2; and FIG. 9 is a diagram showing speed change positions based on ON/OFF combination of solenoid valves.

BEST MODE FOR CARRYING OUT THE INVENTION

The preferred embodiment of the present invention will be described in detail hereinbelow.

Figure 1:
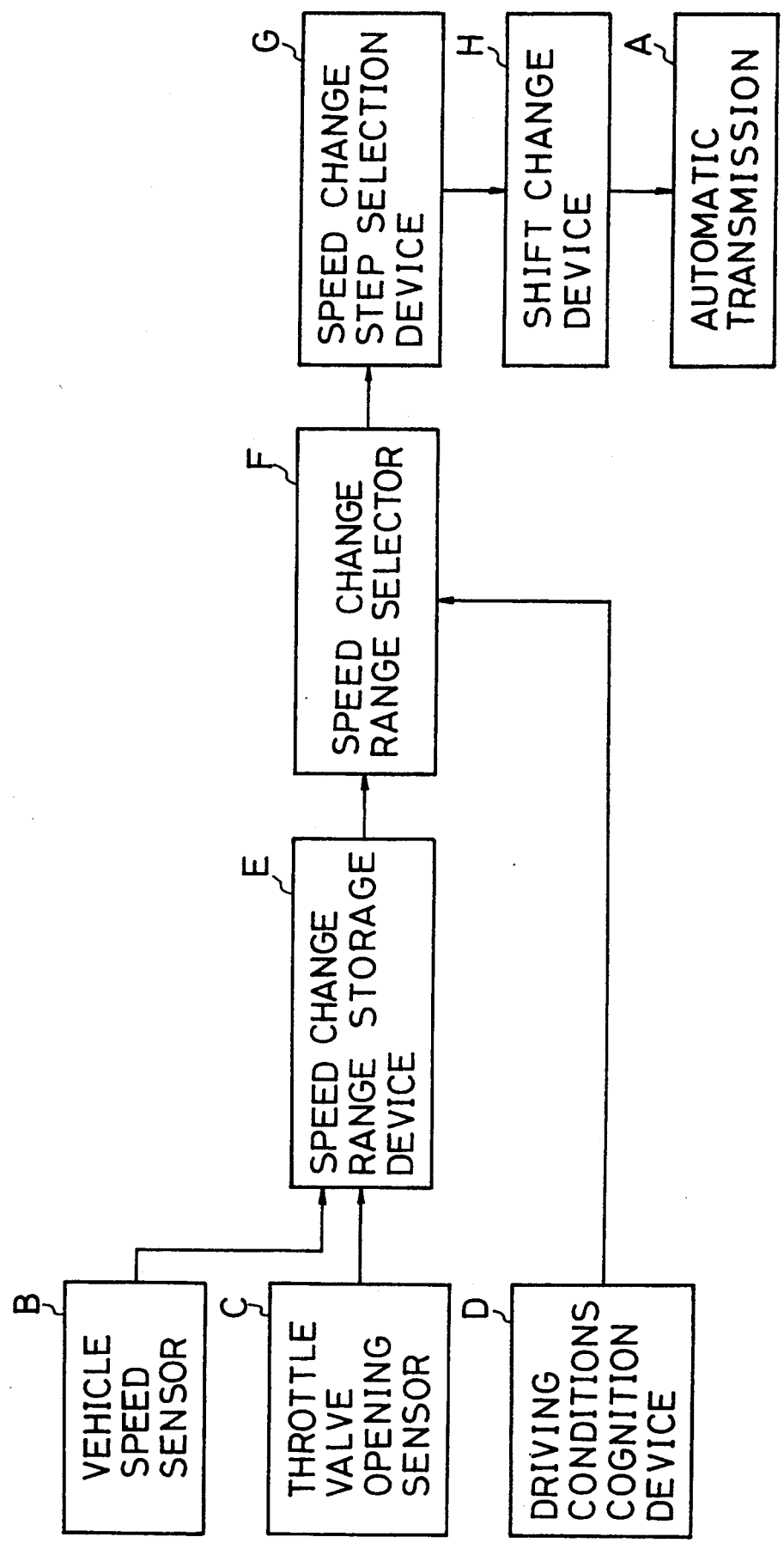
FIG. 1 is a block diagram illustrating a functional arrangement according to the present invention.
Figure 2:
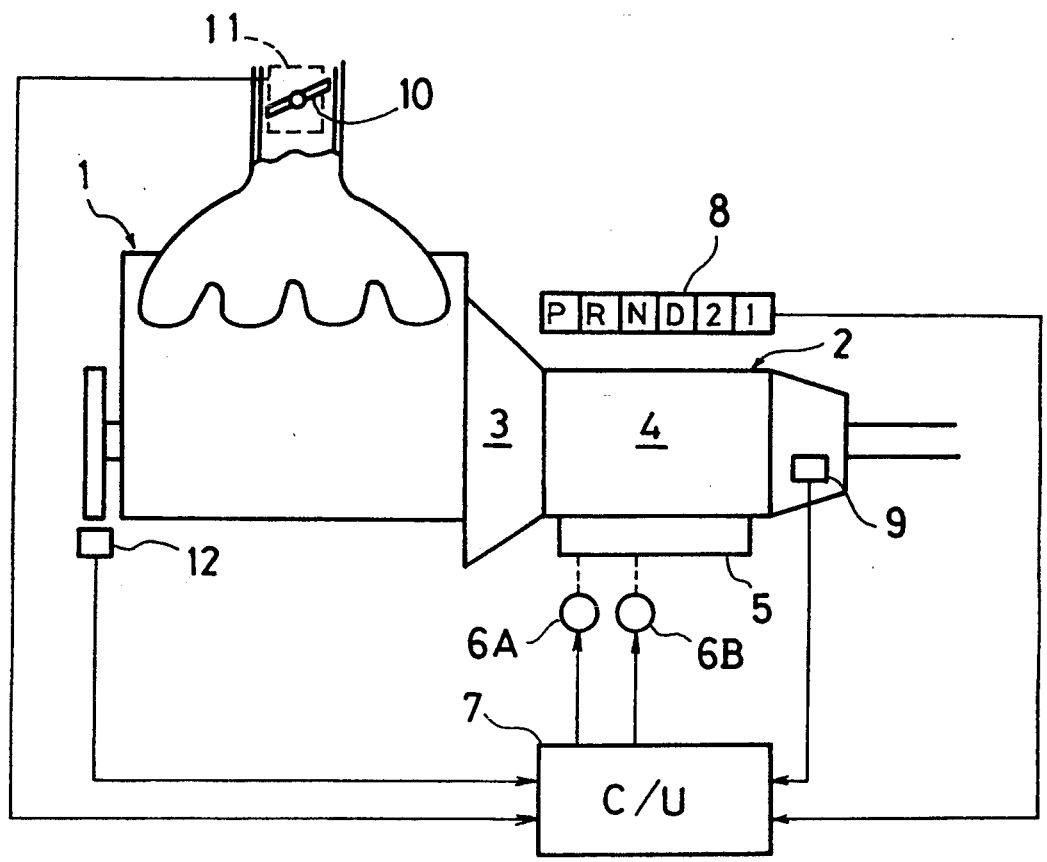
FIG. 2 is a systematic diagram illustrating an embodiment of the present invention.

As shown in FIG. 2, a vehicle engine I has an automatic transmission 2 provided on an output side thereof. The automatic transmission 2 comprises a torque converter 3, a gear type speed changer 4 connected to the engine output by way of the torque converter 3, and a hydraulic actuator 5 whereby various speed change gears in the gear type speed changer 4 may be engaged and disengaged. The operating pressure for the hydraulic actuator 5 may be turned on and off by means of various solenoid valves. In the present case however, only shift solenoid valves 6A, 6B for the automatic transmission shift are shown. A control unit 7 incorporating a microcomputer controls the shift solenoid valves 6A, 6B in accordance with control signals from various sensors, to operate the hydraulic actuator 5 thereby effecting speed change control of the gear type speed changer 4.

The various sensors include a position sensor 8 for detecting the operating positions (P,R,N,D,2,1) of a select lever (not shown in the figure).

A potentiometer type throttle valve sensor 11 is provided for sensing the opening (TVO) of a throttle valve 10 in the air intake system of the engine 1.

A crank angle sensor 12 is provided either on the crank shaft of the engine I or on a shaft rotating at the same speed as the crank shaft. Engine rotational speed Ne is computed from the frequency of pulse signals from the crank angle sensor 12, for example the frequency of pulse signals per unit crank angle.

A vehicle speed sensor 9 is provided for detecting the vehicle speed (VSP) on the basis of a rotation signal from the output shaft of the automatic transmission 2.

The control unit 7 controls the speed change on the basis of various input signals, to suit to the operating position of the select lever and the vehicle driving conditions.

More specifically, with the select lever in the D-range, a speed change position from speed I to speed 4 is automatically set as described below, and the speed change of the gear type speed changer 4 controlled to the Set speed change position by controlling the ON/OFF combinations of the shift solenoid valves 6A and 6B.

The control unit 7 is equipped in software fashion with a driving conditions cognition device for recognizing/judging driving conditions, a speed change range storage device for pre-storing, on the basis of vehicle speed (VSP) and throttle valve opening(TVO), speed change ranges contained in a plurality of speed change steps and classified into a number of partitions ranging from a first speed change range for travelling speeds of n or n+1, to k+1 speed change range for traveling speeds of n+k or n+k+1, a speed change range selector for selecting from the speed change range storage device a single speed change range out of the speed change ranges from the first speed change range to the k+1 speed change range, on the basis of the vehicle speed (VSP) and throttle valve opening (TVO) sensed by the respective vehicle speed sensor 9 and throttle valve sensor I 1, a speed change step selection device for selecting a speed change position for either a low speed change step or a high speed change step from the previously selected speed change range, on the basis of vehicle driving conditions recognized by the driving conditions cognition device, and a shift change device for changing the shift step of the automatic transmission according to the selected speed change position.

Figure 3:
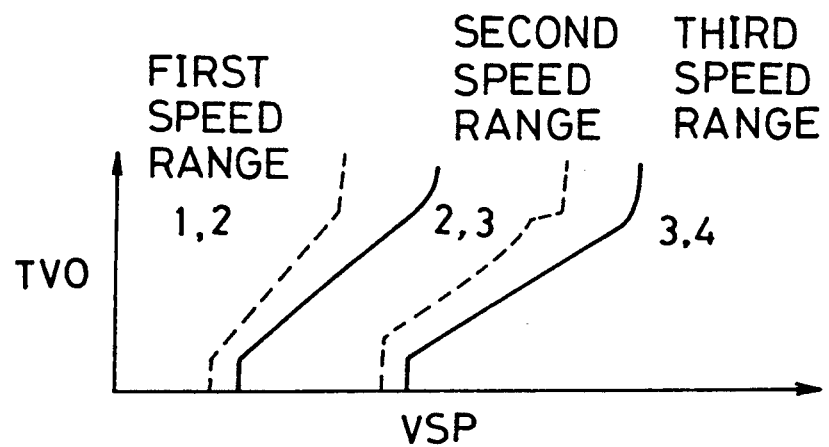
FIG. 3 represents a map showing speed change ranges for the embodiment of FIG. 2.

That is to say, the ROM incorporated into the control unit 7 is provided with a map as shown in FIG. 3 setting for example a first speed change range (first speed, second speed), a second speed change range (second speed, third speed) and a third speed change range (third speed, fourth speed) corresponding to the vehicle speed (VSP) and the throttle valve opening (TVO). This map corresponds to the speed change range storage device of the present invention.

Speed change control is carried out to suit the operating position of the select lever. More specifically, when the select lever is in the D-range, then, as will be discussed later, a speed change range from the map of first to third speed change ranges, which corresponds to the previously mentioned sensed vehicle speed (VSP) and throttle valve opening (TVO) is set.

As follows is an outline of features of the driving conditions cognition device.

A feature of this device is that it is structured to select a speed change step similar to one which a driver would intentionally set, by applying fuzzy control logic.

Fuzzy control logic itself has recently been applied to a variety of fields. Briefly fuzzy control logic involves the vague cognition of a condition of an object to be controlled and the establishment of control rules which determine a control value based on the recognized condition.

Standards of condition judgment or details of operation are treated within this control rule as vague values (expressed as levels of fuzziness) and quantified as membership functions.

The steps in creating the control rules necessary for installation of the fuzzy control logic into the driving conditions cognition device at the design stage of the automatic transmission control system are as follows:

(1) Creation of control rules

Create the control rules for selecting shift up, shift down, or hold to suit to driving conditions.

(2) Determination of parameters and membership functions

Simultaneous with the creation, decide on the parameters to be used for simultaneously recognizing the conditions of the objects to be controlled, and determine evaluation criteria by setting membership functions of the parameters.

Figure 4:
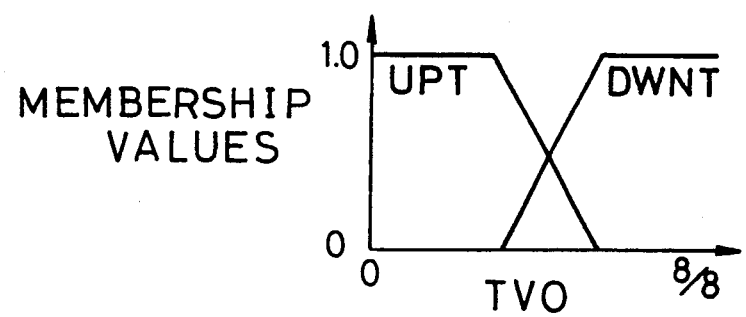
FIG. 4 represents a membership function map for the embodiment of FIG. 2.
Figure 5:
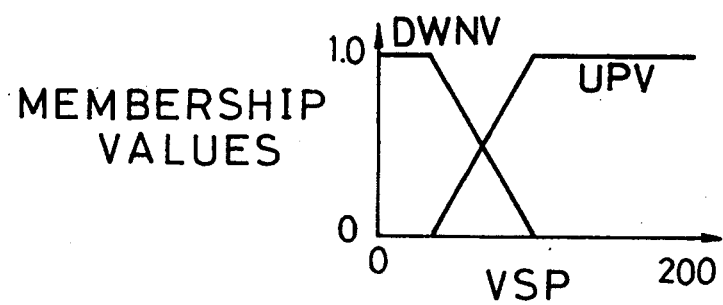
FIG. 5 represents another membership function map for the embodiment of FIG. 2.
Figure 6:
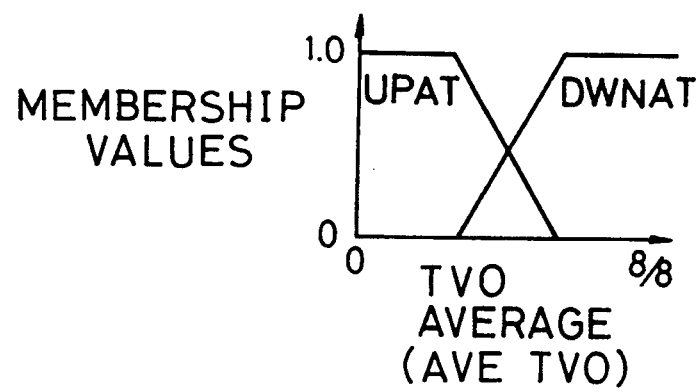
FIG. 6 represents yet another membership function map for the embodiment of FIG. 2.

For these parameters, the driving conditions cognition device of the present invention uses vehicle speed (VSP) and throttle valve opening (TVO), sensed by the vehicle speed sensor 9 and the throttle valve sensor 11 respectively, and the average value of the throttle valve opening (AVETVO). Maps as shown in FIG. 4 to FIG. 6, with coordinates having vehicle speed(VSP), throttle valve opening (TVO), and average throttle valve opening (AVETVO) parameters on the respective horizontal axes, and membership values from 0 to 1.0 on the vertical axis are provided in the vehicle speed cognition device. These parameters have predetermined wave shapes (the membership functions for determining the before mentioned evaluation criterion), namely shape which set the criterion for evaluation of the shift up (UP), and shift down (DWN) operations. The membership functions in these maps are made different for each of the before mentioned first, second and third speed change ranges respectively.

The previously mentioned parameters are detected while the vehicle is being driven, and one membership value is read from each of the shift up (UP) and shift down (DWN) membership function maps. A control rule evaluation value is determined from these read membership Values, and the control rule determined from the evaluation value is selected. A control result (for example shift up or shift down, or hold) based on the selected control rule is then determined, and the ON/OFF combination of the shift solenoid values 6A, 6B controlled to hold the gear type speed changer 4 in the required speed change position by means of the hydraulic actuator 5.

With each parameter, a membership value is obtained for each evaluation criterion. The smallest of the membership values for each evaluation criterion becomes the assessment value for the control rule for each of the evaluation criteria, and the control result (for example shift up, shift down or hold) is determined on the basis of these assessment values.

FIG. 8 represents a map for guiding the control results from the relationships of assessment values for the control rule for each of the evaluation criteria.

Operation of the apparatus of the present invention will now be described with reference to FIGS. 3 to 9.

Figure 7:
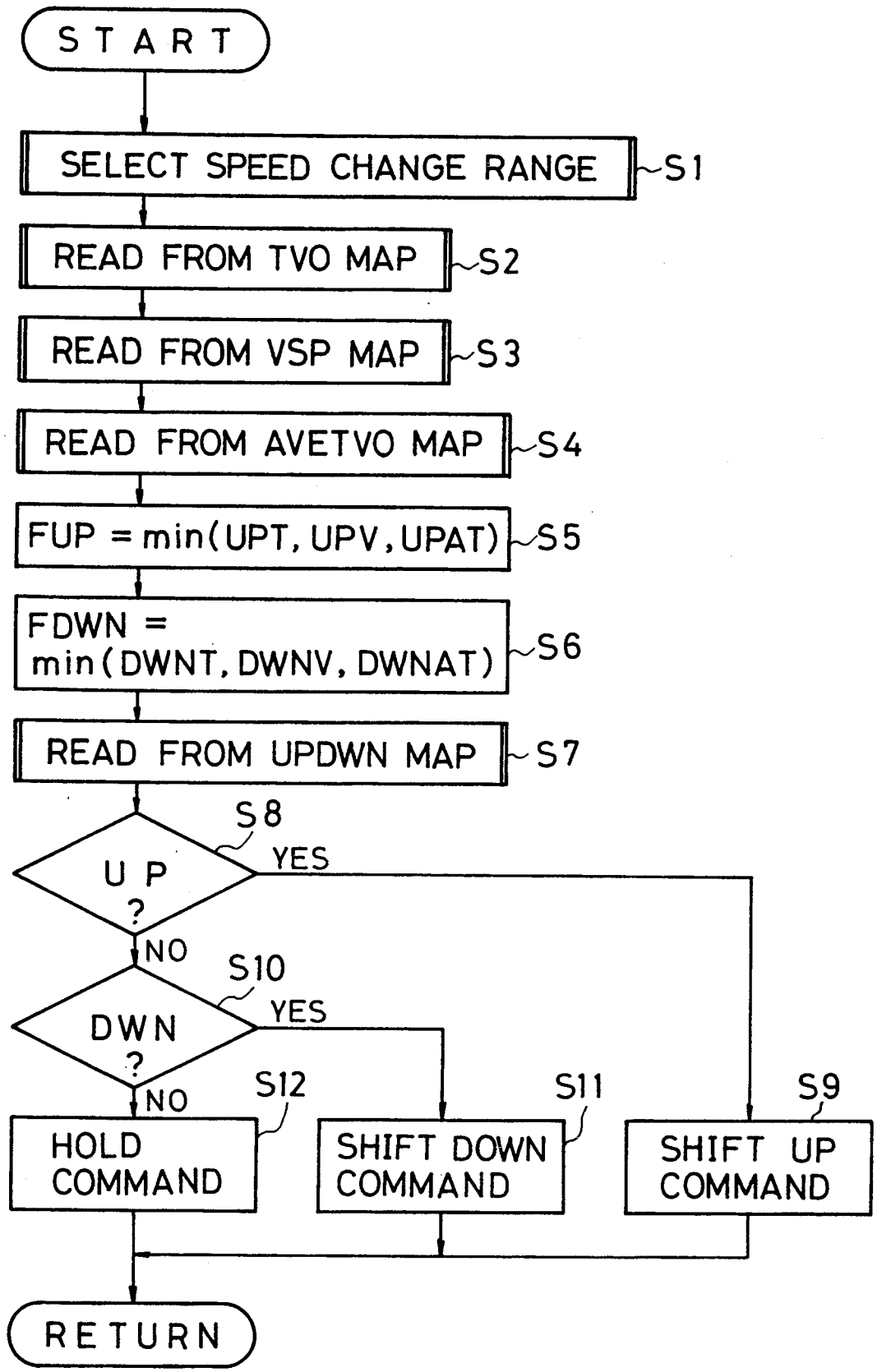
FIG. 7 is a flow chart for illustrating the operation of the embodiment of FIG. 2.

FIG. 7 is a flow chart of the main routine for briefly illustrating the operation of the present apparatus.

In step 1 (S1 in the figure with subsequent steps indicated by S), a speed change range for the current vehicle speed (VSP) and throttle valve opening (TVO) is selected from the FIG. 3 map of set speed change ranges corresponding to vehicle speed (VSP) and throttle valve opening (TVO).

In step 2, the membership values for shift up (UPT) and shift down (DWNT) corresponding to the current throttle valve opening (TVO) are read from the map of FIG. 4 (TVO map).

In step 3, the membership values for shift up (UPV) and shift down (DWNV) corresponding to the current vehicle speed (VSP) are read from the map of FIG. 5 (VSP map).

In step 4, the membership values for shift up (UPAT) and shift down (DWNAT) corresponding to the current average throttle valve opening (AVETVO) are read from the map of FIG. 6 (AVETVO map).

In step 5, the smallest of the previously read UPT, UPV, and UPAT membership values is selected and stored as FUP.

In step 6, the smallest of the previously read DWNT, DWNV, and DVVNAT membership values is selected and stored as FDWN.

In step 7, the judgment result corresponding to the current FUP and FDWN membership values is read from the FIG. 8 map (UPDWN map) of predetermined shift up (UP), shift down (DWN), and hold (H) judgment results corresponding to FUP and FDWN membership values.

In step 8, the judgment result determined in step 7 is tested to see whether or not this is shift up (UP). If shift up (UP), control proceeds to step 9 to output the shift up command. If not shift up (UP), control proceeds to step 10, and the judgment result is tested to see whether or not this is shift down (DWN). If shift down (DWN), control proceeds to step 11 to output a shift down command. If not shift down (DWN), control proceeds to step 12 to output a hold command.

The solenoid valves 6A, 6B are then controlled according to the ON/OFF combinations shown in FIG. 9 to operate the actuator 5, thereby controlling the speed change positioning of the gear type speed changer 4.

The map of FIG. 5 corresponds to the first storage device of the present invention, while the maps of FIG. 4, FIG. 6, and FIG. 8 correspond to the second, third, and fourth storage devices respectively.

Moreover, in the flow chart of FIG. 7, steps 2 to 7 correspond to the driving conditions cognition device of the present invention. Step 2 corresponds to the second look-up device, step 3 corresponds to the first look-up device, step 4 corresponds to the third look-up device, step 5 corresponds to the first setting device, step 6 corresponds to the second setting device, and step 7 corresponds to the fourth look-up device.

Steps 8 to 12 correspond to the output device which makes up the speed change range selector of the present invention.

In the above mentioned speed change controller for a vehicle automatic transmission, a speed change range is selected on the basis of the current vehicle speed and throttle valve opening from a storage device (map) in which is stored set speed change ranges corresponding to vehicle speed and throttle valve opening. With this arrangement it is thus not necessary to look-up one curve out of all the speed change curves related to drive information. Hence the computational load in the control portion of the controller may be reduced.

Moreover, by processing the information through fuzzy deduction wherein driving conditions of the vehicle (including ambient conditions) are captured as a plurality of parameters, a more accurate speed change judgment then with conventional equipment becomes possible. Also since speed change timing is not judged mechanically by throttle valve opening and vehicle speed, on the basis of predetermined speed change curves as with conventional apparatus, speed change control to suit to driving conditions and environmental changes becomes possible.

INDUSTRIAL APPLICABILITY

With the above described speed change controller for vehicle automatic transmission, speed change control in accordance with the intentions of the drivers may be realized, making it easy to cater equally to the individual requirements of a large variety of drivers.

We claim:
1. A speed change controller for a vehicle automatic transmission, and controller comprising;
   an automatic transmission provided on the output side of an internal combustion engine of the vehicle,
   a vehicle speed sensing means for sensing vehicle speed,
   a throttle valve opening sensing means for sensing the opening of a throttle valve in an air intake system of the engine,
   a driving conditions cognition means for cognition/judgment of vehicle driving conditions.
   a speed change range storage means for pre-storing, on the basis of vehicle driving conditions, speed change ranges contained in a plurality of speed change steps and classified into a number of partitions ranging from a first speed change range for traveling speeds of n or n+1, to a k+1 speed change range for traveling speeds of n+k or n+k+1,
   a speed change range selection means for selecting from said speed change range storage means, a single speed change range out of the speed change ranges from said first speed change range to said k+1 speed change range, on the basis of vehicle speed and throttle valve opening sensed by said vehicle speed sensing means and said throttle valve opening sensing means respectively,
   a speed change step selection means for selecting from said selected speed change range, a speed change position for either a low speed change step or a high speed change step, on the basis of vehicle driving conditions recognized by said driving conditions cognition means, and
   a shift change means for changing the shift step of said automatic transmission according to said selected speed change position.

2. The speed change controller according to claim 1, wherein said automatic transmission comprises a torque converter, a gear type speed changer connected to said engine output side by way of said torque converter, and an actuator for engagement and disengagement of various gears in said gear type speed changer, the arrangement and construction being such that speed change control is effected through said gear type speed changer by control of said actuator.

3. The speed change controller according to claim 1, wherein said speed change range storage means comprises map predetermining speed change ranges contained in a plurality of speed change steps and classified into a number of partitions ranging from a first speed change range for traveling speeds of n or n+1, to a k+1 speed change range for traveling speeds of n+k or n+k+1, said map being stored on the basis of vehicle speed and throttle valve opening in a ROM incorporated into a control unit.

4. The speed change controller according to claim 3, wherein said map predetermines first (first speed, second speed), second (second speed, third speed) and third (third speed, fourth speed) speed change ranges corresponding to vehicle speed and throttle valve opening.

5. The speed change controller according to claim 1, wherein said driving conditions cognition means comprises;
   a first, second and third storage means wherein each of the vehicle speed, throttle valve opening and average throttle valve opening parameters are given in the forms of membership functions for determining the shift up (UP) and shift down (DWN) evaluation criteria said membership functions being made different for each of the speed change ranges, and wherein the relationships between said vehicle speed, throttle valve opening and average throttle valve opening parameters and said membership values are prestored for each of said vehicle speed, throttle valve opening and average throttle valve opening,
   a first look-up means for reading from the first storage means, a shift up (UPV) membership value, or a shift down (DWNV) membership value corresponding to a vehicle speed,
   a second look-up means for reading from the second storage means, a shift up (UPT) membership value, or a shift down (DWNT) membership value corresponding to a throttle valve opening,
   a third look-up means for reading from the third storage means, a shift up (UPAT) membership value, or a shift down (DWNAT) membership value corresponding to an average throttle valve opening, a first setting means for selecting and setting the smallest of the read UPT, UPV and UPAT membership values, a second setting means for selecting and setting the smallest of the read DWNT, DWNV. and DWNAT membership values, a fourth storage means in which judgment results for shift up (UP), shift down (DWN) and hold (H) are preset by the smallest of the UPT, UPV and UPAT membership values, and the smallest of the DWNT, DWNV and DWNAT membership values, and a fourth look-up means for reading from the fourth storage means, judgment results corresponding to the smallest of the current UPT, UPV, UPAT membership values, and the smallest of the current DWNT, DWNV, DWNAT membership values, and said speed change step selection means comprises;

an output means for outputting to said shift change means one of a shift up (UP), a shift down (DWN) or a hold (H) command based on the judgment result read by said fourth look-up means.

* * * * *